United States Patent
Cheng et al.

(10) Patent No.: US 10,430,217 B2
(45) Date of Patent: Oct. 1, 2019

(54) HIGH AVAILABILITY USING DYNAMIC QUORUM-BASED ARBITRATION

(71) Applicant: VMware, Inc., Palo Alto, CA (US)

(72) Inventors: Cheng Cheng, West Lafayette, IN (US); Amit Bose, San Jose, CA (US); Ashish K. Hanwadikar, San Jose, CA (US); Min Cai, Sunnyvale, CA (US); Dilpreet S. Bindra, Hayward, CA (US)

(73) Assignee: VMware, Inc., Palo Alto, CA (US)

( * ) Notice: Subject to any disclaimer, the term of this patent is extended or adjusted under 35 U.S.C. 154(b) by 394 days.

(21) Appl. No.: 14/028,122

(22) Filed: Sep. 16, 2013

(65) Prior Publication Data
US 2015/0082302 A1  Mar. 19, 2015

(51) Int. Cl.
G06F 9/455 (2018.01)
G06F 11/14 (2006.01)
G06F 11/20 (2006.01)

(52) U.S. Cl.
CPC ...... *G06F 9/45533* (2013.01); *G06F 11/1484* (2013.01); *G06F 11/20* (2013.01); *G06F 11/2056* (2013.01)

(58) Field of Classification Search
CPC .................................................. G06F 1469/471
See application file for complete search history.

(56) References Cited

U.S. PATENT DOCUMENTS

| | | | | |
|---|---|---|---|---|
| 2002/0152363 A1* | 10/2002 | Gailer | ................ | G06F 11/2094 711/162 |
| 2009/0019098 A1* | 1/2009 | Gunda | ................. | G06F 11/004 |
| 2010/0070725 A1* | 3/2010 | Prahlad | ............... | G06F 11/1453 711/162 |
| 2012/0179798 A1* | 7/2012 | Pafumi | ................ | G06F 9/5072 709/223 |
| 2012/0185553 A1* | 7/2012 | Nelson | .................... | H04L 41/04 709/209 |

OTHER PUBLICATIONS

Mike Burrows, The Chubby lock service for loosely-coupled distributed systems, In Proceedings of the 7th symposium on Operating systems design and implementation, OSDI '06, pp. 335-350, 2006.

(Continued)

*Primary Examiner* — Wynuel S Aquino
*Assistant Examiner* — Melissa A Headly
(74) *Attorney, Agent, or Firm* — Fish & Richardson P.C.

(57) ABSTRACT

Exemplary methods, apparatuses, and systems include a first virtual infrastructure manager (VIM) determining that the first VIM is to be an active manager of a plurality of virtual machines running on a plurality of host devices and that a second VIM is to be a standby manager of the plurality of virtual machines. The first VIM selects a first host device from the plurality of host devices to serve as a passive witness node in arbitrating active and standby roles between the first VIM and second VIM. The first host device runs one or more virtual machines and is managed by the active manager. The first VIM selects a first host device by confirming that the first host device is available to each of the first VIM and the second VIM. The first VIM writes a file on the first host device indicating that the first VIM is the active manager.

20 Claims, 5 Drawing Sheets

(56) References Cited

OTHER PUBLICATIONS

Chapter 28, Introduction to the Common Address Redundancy Protocol (CARP), Part IV Networking and related issues, downloaded at: www.netbsd.org/docs/guide/en/chap-carp.html on Aug. 1, 2013, 5 pages.
DRBD, Software Development for High Availability Clusters, LINBIT HA-Solutions GmbH, Copyright 2008-2011, downloaded on Aug. 1, 2013 at: http://www.drbd.org/home/what-is-drbd/ , 5 pages.
R. G. Gallager et al. , A distributed algorithm for minimum-weight spanning trees, ACM Transactions on Programming Languages and Systems, vol. 5, No. 1, Jan. 1983, pp. 66-77.
ZooKeeper—A Reliable, Scalable Distributed Coordination System, Jul. 15, 2008, downloaded at: http://highscalability.com/blog/2008/7/15/zookeeper-a-reliable-scalable-distributed-coordination-syste.html, 7 pages.
Apache ZooKeeper—Apache Software Foundation, downloaded on Aug. 1, 2013 at: https://cwiki.apache.org/confluence/display/ZOOKEEPER/Index, 4 pages.
E. Korach, et al., A modular technique for the design of efficient distributed leader finding algorithms, In Proceedings of the fourth annual ACM symposium on Principles of distributed computing, PODC '85, Aug. 1985, pp. 163-174.
L. Lamport et al., Cheap Paxos, Proceedings of the 2004 International Conference on Dependable Systems and Networks (DSN'04), Copyright 2004 IEEE, pp. 307-314.
L. Lamport, Fast Paxos, Distributed Computing, Technical Report MSR-TR-2005-112, 19(2):79-103, 2006.
L. Lamport, Generalized Consensus and Paxos, Technical Report MSR-TR-2005-33, Microsoft Research, 2005, 63 pages.
L. Lamport. The Part-Time Parliament, ACM Transactions on Computer Systems, 16(2):133-169, 1998.
PostgreSQL: Documentation: 9.1: High Availability, Load Balancing, and Replication, The PostgreSQL Global Development Group, Copyright 1996-2013, downloaded on Aug. 1, 2013 at: http://www.postgresql.org/docs/9.1/static/high-availability.htm, 23 pages.
UCARP—About, downloaded on Aug. 1, 2013 at: www.pureftpd.org/project/ucarp, 2 pages.
VMware vFabric Data Director, Database as a Service in Your Cloud, Datasheet, Copyright 2013, downloaded on Aug. 1, 2013, VMware, Inc., 2 pages.
VMware vCenter Server Heartbeat, Protection for High Availability of Virtualization Services, Datasheet, Copyright 2012, downloaded on Aug. 1, 2013, VMware, Inc., 2 pages.

\* cited by examiner

HIGH AVAILABILITY USING DYNAMIC QUORUM-BASED ARBITRATION

FIELD OF THE INVENTION

The various embodiments described herein relate to a highly available virtualization management platform. In particular, embodiments relate to active and standby virtual infrastructure managers achieving minimal downtime by using dynamic, managed host devices as passive witness nodes for quorum-based arbitration.

BACKGROUND OF THE INVENTION

A software-defined datacenter (SDDC) may be used to provide a number of cloud-based services, such as virtual desktops, firewalls, load balancing, and other network services. A virtualization management platform enables a number of features in the SDDC, including central virtual machine (VM) provisioning, updating, patching, and securing virtual desktops, resource management, VM high-availability, intelligent policy management, etc. As the workload running in an SDDC becomes more critical, there is an increased preference and/or need for the virtualization management platform to be highly available and resilient to hardware and software failures. For example, hardware failures may occur on various components in an SDDC, including a physical host device, storage devices, and networking devices. Exemplary software failures include VM operating system failures, database failures, and virtualization management platform failures. Given the interdependence of the various hardware and software components within the SDDC, one failure may lead to multiple problems and delays.

SUMMARY OF THE INVENTION

Exemplary methods, apparatuses, and systems include a first virtual infrastructure manager (VIM) determining that the first VIM is to be an active manager of a plurality of virtual machines (VMs) running on a plurality of host devices and that a second VIM is to be a standby manager of the plurality of VMs. The first VIM further selects a first set of one or more host devices from the plurality of host devices to serve as a passive witness node in arbitrating active and standby roles between the first VIM and second VIM. The first set of host devices runs one or more virtual machines and is managed by the active manager. The first manager selects a first set of host devices by confirming that the first set of host devices is available to each of the first VIM and the second VIM. The first VIM writes a first file on the first set of host devices indicating that the first VIM is the active manager.

In one embodiment, the first or second VIM determines that the first host device is no longer available. In response, the first VIM selects a second host device to serve as the passive witness node. The first VIM writes a second file on the second host device indicating that the first VIM is the active manager.

Other features and advantages will be apparent from the accompanying drawings and from the detailed description.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

Embodiments of a highly available virtualization management platform include an active virtual infrastructure manager (VIM) and a standby VIM. Management data is replicated from the active VIM to the standby VIM to enable the standby VIM to become the active VIM in a fail-over situation. The platform utilizes existing elements of the system, host devices managed by the active VIM, as a dynamic set of nodes that can be used for quorum-based arbitration. For example, when a VIM fails or when the active and standby VIMs are unable to communicate with one another, a host device quorum node enables one or both VIMs to determine which VIM remains/becomes the active VIM and which VIM remains/becomes the standby VIM. As a result, the virtualization management platform achieves very low downtimes without additional administrative overhead required for maintaining a separate quorum node.

Figure 1:
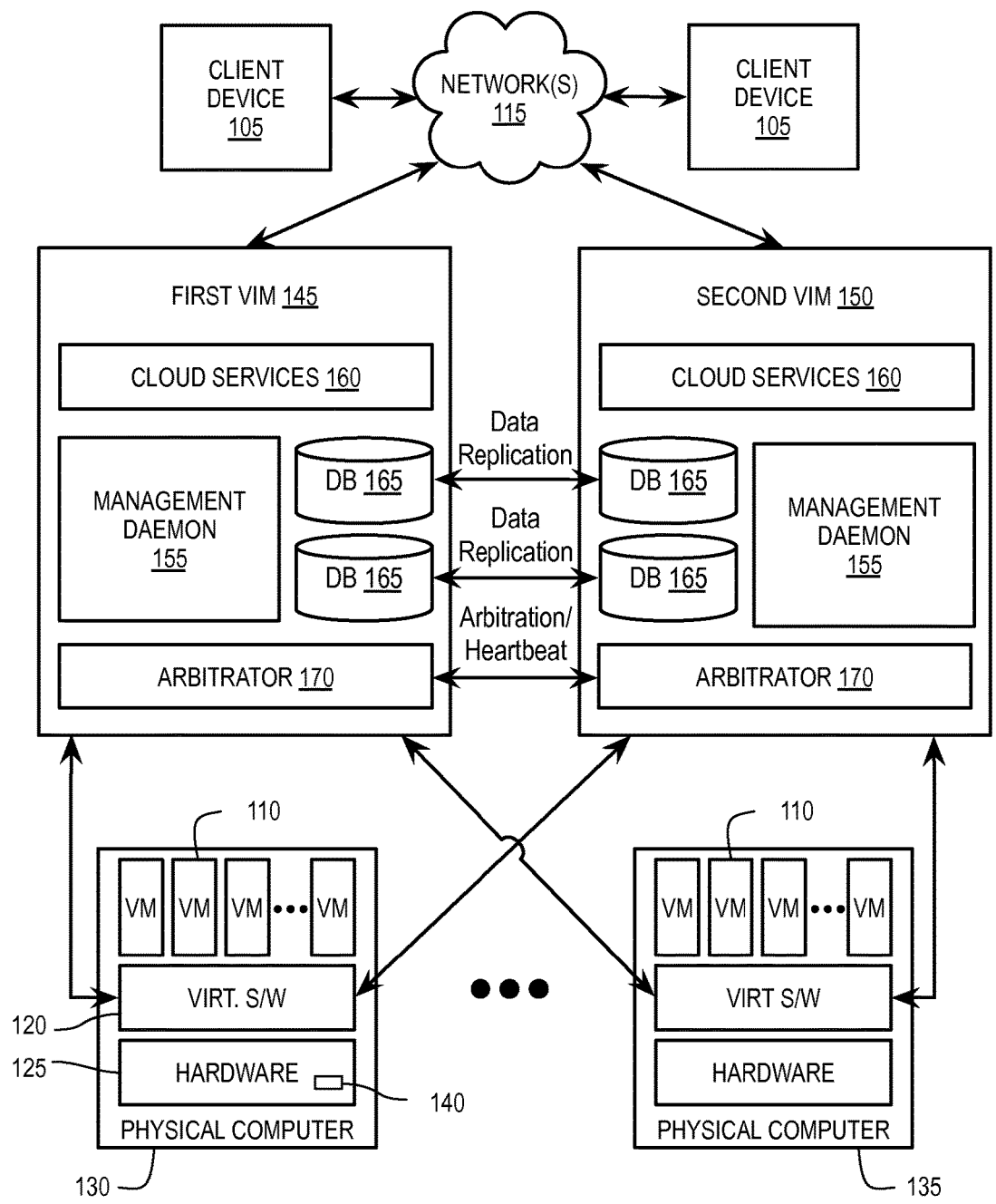
FIG. 1 illustrates, in block diagram form, an exemplary software-defined datacenter including a highly available virtualization management platform utilizing active and standby virtual infrastructure managers and dynamic, managed host devices as passive witness nodes for quorum-based arbitration.

FIG. 1 illustrates, in block diagram form, an exemplary software-defined datacenter (SDDC) including a highly available virtualization management platform utilizing active and standby virtual infrastructure managers and dynamic, managed host devices as passive witness nodes for quorum-based arbitration. Server-based computing in a SDDC environment allows client devices 105 to access centrally managed user virtual desktops, such as those implemented by VMs 110, via network(s) 115 (e.g., a local area network or other private or publically accessible wide area network, such as the Internet). In one embodiment, client devices 105 and client VMs 110 use a desktop remoting protocol such as Remote Desktop Protocol (RDP), Virtual Network Computing (VNC), or Personal Computer over Internet Protocol (PCoIP) to remotely access/provide remote access to a virtual desktop generated by client VM 110. The term "desktop," as used herein, refers to a human interface environment through which users can launch, interact with, and manage applications, settings, and/or data, etc. A virtual desktop is a virtual computing system that operates as a desktop or workstation computer with which an end user can interact using desktop remoting protocol and the software and/or hardware of client device 105. A virtualized desktop may export user interfaces, e.g., keyboard and mouse input, audio and visual output, to client device 105 from client VM 110 running remotely (in a datacenter) or locally on client device 105, or, in some cases, using a hybrid. Client device 105 transmits user input, e.g., keyboard or mouse input, to client VM 110 to be processed, and receives display and other data, such as sound, from client VM 110 for presentation to a user of client device 105. Client device 105 presents a bitmap representation of the desktop generated by client VM 110. Input to and output from the virtualized desktop are reflected in the bitmap representation on client device 105 as it occurs on the virtualized desktop within client VM 110. Additionally, one or more VMs 110 may serve as a virtual appliance or provide another service.

VMs 110 are complete computation environments, containing virtual equivalents of the hardware and system software components of a physical system and are typically implemented by an extensive virtualization infrastructure, which includes a variety of software and hardware components. Virtualization software layer 120 (e.g., a hypervisor) running on hardware 125 of physical computer (e.g., host device) 130/135 manages one or more VMs 110. Virtualization software layer 120 manages physical resources, e.g., hardware 125, as well as maintains virtual-to-physical hardware mappings. For example, virtualization software 120 may manage the storage of files within memory 140 within hardware 125.

An active VIM 145/150 is responsible for provisioning and maintaining the multitude of VMs 110 implemented across one or more physical computers (hosts) 130/135. Active VIM 145/150 also provides a software interface to enable an administrator to access and manage VMs 110. For example, each VIM 145/150 includes management daemon 155 that is able to provide a management console for manual and automated control of virtualized hosts 130 and VMs 110. In one embodiment, one or more VIMs 145/150 are implemented within a server or other networked computing device. Additionally, one or more VIMs 145/150 may be implemented by a virtual machine running within a server or other networked computing device.

Each VIM 145/150 further includes and/or manages one or more cloud services 160. Exemplary cloud services 160 include a firewall for a SDDC; a recovery manager to facilitate automated recovery plans and fail over for applications; a director to build secure, multi-tenant private clouds by pooling infrastructure resources; and an operations manager to manage the performance of virtual environments.

In one embodiment, the VIMs 145/150 use a virtual Internet Protocol (IP) address to identify the active/standby VIM pair. Each VIM 145/150 has its own private IP address that is not exposed to client devices 105. Client devices 105 send requests to the virtual IP address, which is then mapped to the private IP address of the active VIM 145/150. The virtual IP address provides client transparency, e.g., when the active VIM 145/150 fails and the standby VIM 145/150 takes over. In one embodiment, the VIMs 145/150 use an implementation of the Common Address Redundancy Protocol (CARP) to share the single virtual IP address. For example, active VIM 145/150 runs a CARP daemon in master mode while standby VIM 145/150 runs a CARP daemon in slave mode. During failover, the slave promotes itself as the new master. The new master CARP daemon takes over the virtual IP address and broadcasts an address resolution protocol message. A connected router in network 115 picks up the message and routes all traffic for the virtual IP to the newly active instance. In one embodiment, clients 105 detect the connection loss and reconnect to the virtual IP address (now connected to the new active VIM 145/150).

One or more services provided by VIM 145/150 use one or more local persistent data stores 165. In addition, some persistent data is stored in the local file system in the form of configuration files, journal files, etc. To ensure that services recover properly on the standby after failover, persistent data is replicated from active VIM 145/150 to standby VIM 145/150. In one embodiment, VIMs 145/150 perform data replication synchronously. Alternatively, VIMs 145/150 perform data replication asynchronously. While asynchronous replication may be performed with less overhead, it can lead to data loss and introduce data inconsistencies that lead to difficult recovery. With synchronous replication, however, the conflict resolution capabilities of the corresponding services are the same as those needed for ordinary crash recovery.

In one embodiment, each VIM 145/150 maintains a self-contained instance of a relational database 165 to store the information needed by management daemon 155. The active VIM 145/150 runs the relational database 165 in the master role so that it will process transactions and commit them to the persistent storage. The standby VIM 145/150 runs its instance of the relational database 165 in replicated slave mode so that it is a read-only replica of the master. As a result, the standby instance of relational database 165 does not process any transactions but is able to serve read-only queries.

In one embodiment, VIMs 145/150 use log streaming based synchronous replication of persistent data. This ensures that the master instance will not commit a transaction until the slave instance acknowledges that the commit has been written to its transaction log. The master instance operates in a continuous archiving mode, while the slave operates in a continuous recovery mode. The master instance maintains write-ahead logs (WALs) of transactions, which are streamed over to the slave instance. In one embodiment, the master instance runs a dedicated WAL sender process to send WALs to the slave instance. Similarly, the slave instance runs a WAL receiver process to receive the WAL entries and write them out to its transaction log on a local disk. The slave instance also replays the WALs to update its copy of data store 165.

In one embodiment, VIMs 145/150 use a software-based, shared-nothing, replicated storage solution such as Distributed Replicated Block Device (DRBD®). This type of replication solution allows mirroring of the content of block devices, such as hard disks, partitions, logical volumes, etc., between active and standby VIMs 145/150. For example, DRBD® layers logical block devices over existing local block devices on participating instances. Writes to the DRBD® devices on an active instance are transferred to the lower-level block devices and simultaneously propagated to the standby instance. File writes on the active instance are deemed complete after the writes have been carried out on the standby. This replication occurs continuously, even while applications are modifying the data. Applications may remain unaware of replication and, therefore, do not require modification to replicate the data. In one embodiment, active VIM 145/150 stores data that changes less frequently, e.g., configuration files and data from non-replicated persistent stores, in a separate block device such as a virtual disk. DRBD®, or a similar replicated storage solution, may be configured to mirror these separate disks only.

In one embodiment, some persistent data can be obtained or inferred from other data. For example, inventory data stored in one data store 165 may be reconstructed from data in another data store 165. In one embodiment, active VIM 145/150 avoids the replication of such data to reduce replication traffic. In such an embodiment, standby VIM 145/150 reconstructs this data incrementally and independently.

In one embodiment, one or more services in VIMs 145/150 are unaware of underlying data replication. Additionally, these services within the standby VIM 145/150 are not running and are started up only when a failover happens. This ensures no modifications to the persistent data are made by the standby VIM 145/150. It may be advantageous, however, to allow some services within standby VIM 145/150 to take advantage of the replicated data (for example, to reduce failover time). In such an embodiment, these services run in a read-only mode.

Arbitrator 170 determines the role of each instance of management daemon 155, cloud services 160, data stores 165, CARP daemon, etc. at start up, when communication between VIMs 145/150 is lost, and during fail over. Additionally, in one embodiment, arbitrator 170 controls the replication of data between active and standby instances. For example, arbitrator 170 detects the failure of active VIM 145/150 and promotes standby VIM 145/150 to the active role. While some individual components in the VIMs 145/150 are capable of determining roles, in one embodiment, these components defer to roles assigned by arbitrator 170. As described further below with reference to FIGS. 2-4, arbitrators 170 exchange messages to determine roles, select a host device 130 to serve as a witness node, and monitor the health of a partner VIM 145/150.

Figure 2:
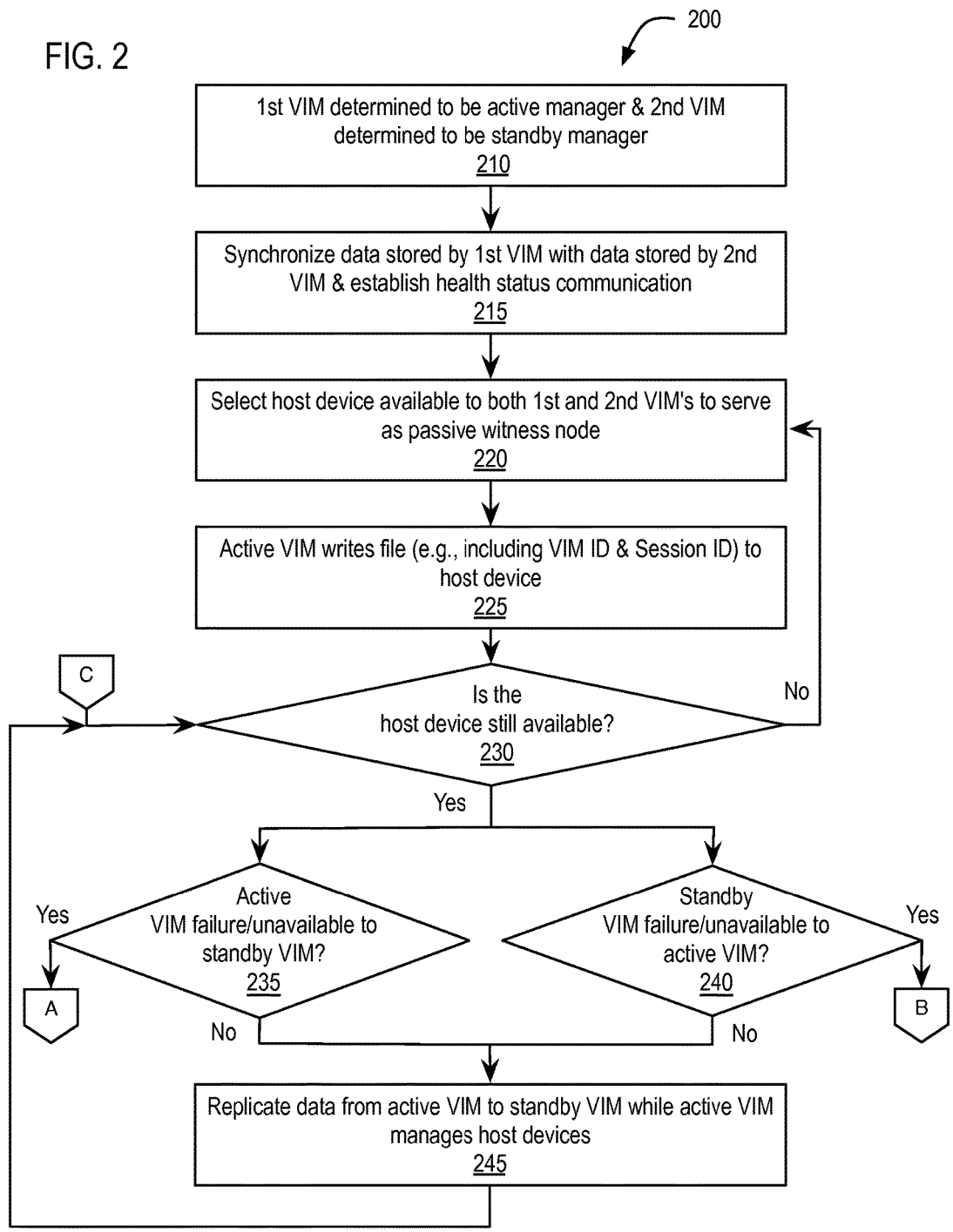
FIG. 2 is a flow chart illustrating an exemplary method of configuring active and standby virtual infrastructure managers and a host device as a passive witness node.

FIG. 2 is a flow chart illustrating exemplary method 200 of configuring active and standby virtual infrastructure managers and a host device as a passive witness node. At block 210, first VIM 145 determines that it will serve as the active instance and that second VIM 150 will serve as the standby instance. For example, the first VIM 145 and second VIM 150 may exchange messages to determine active and standby roles. In one embodiment, both VIMs 145/150 generate a random number and the VIM 145/150 with the highest or lowest number takes the active role. Alternatively, VIMs 145/150 select active and standby roles based upon a comparison of identifiers for each VIM 145/150. In yet another embodiment, VIMs 145/150 are configured with default active/standby roles to assume at start up. In yet another embodiment, VIMs 145/150 both attempt to obtain a lock on a previously selected or default host device and the first VIM 145/150 to obtain the lock assumes the active role. In one embodiment, each VIM 145/150 stores an indication of its role and/or a VIM identifier for the current active VIM 145/150.

At block 215, first VIM 145 synchronizes data stored within first VIM 145 with data stored within second VIM 150. For example, if first VIM 145 stores any management data in a relational database 165 that second VIM 150 lacks, the data is replicated to the corresponding instance of the relational database 165 within second VIM 150.

Additionally, first VIM 145 and second VIM 150 establish a heartbeat or other health status communication via arbitrators 170. In one embodiment, the health status communicated between VIMs 145/150 is simply an indication of whether each VIM 145/150 is operating. For example, the receipt of a health status/heartbeat within a period of time is an indication that a VIM 145/150 is operating and the absence of a health status/heartbeat within a period of time is an indication that a VIM 145/150 has failed or that communication between VIMs 145/150 has been lost. In another embodiment, the health status includes the individual status for one or more services and/or data stores within VIM 145/150. For example, each VIM 145/150 may track its own overall health and/or health of individual components and communicate this health status to another VIM 145/150. The health status may further differentiate between critical and non-critical services. In yet another embodiment, the health status includes an indication of performance of VIM 145/150 generally or of one or more services and/or data stores. For example, indications of performance may include processing times, percentages or counts of failed tasks, etc.

At block 220, first VIM 145 and second VIM 150 select a host device 130 to serve as a passive witness node. In one embodiment, the active or passive instance selects an available host device 130 (e.g., running and in communication with VIM 145/150). For example, first VIM 145 may select a host device 130 based upon a list of host devices 130 managed by first VIM 145 (e.g., the first host device 130 within the list), based upon identifiers for the host devices 130 (e.g., a highest/lowest identifier value), based upon a user-configured policy, or by random selection between host devices 130 managed by and available to first VIM 145. First VIM 145 transmits the selection of the host device 130 to second VIM 150, e.g., via arbitrators 170. If the selected host device 130 is available to second VIM 150 (e.g., VIM 150 can access/manage selected host device 130), second VIM 150 sends a confirmation of the selection to first VIM 145. In one embodiment, VIMs 145/150 use a two-phase or three-phase commit protocol to determine which host device 130 will serve as a passive witness node. While described as the selection of a single host device 130, VIMs 145/150 may select multiple host devices 130 to serve as witness nodes. For example, the description of VIMs 145/150 selecting host device 130 equally applies to VIMs 145/150 selecting a set of one or more host devices to collectively serve as passive witness nodes.

At block 225, active VIM 145/150 writes a file to, or modifies an existing file within, the selected host device 130 (or set of one or more host devices). In one embodiment, the active instance writes the file to/modifies the file within the host device's file system. Alternatively, the active instance writes the file to/modifies the file within another portion of data storage within host device 130. For example, first VIM 145 names, renames, or writes a file named or otherwise including a VIM identifier for first VIM 145 and a session identifier. The session identifier may be set to an initial value or an incremented previous value. Each VIM 145/150 stores a copy of its own VIM identifier and the current session identifier. Additionally, VIMs 145/150 may transmit one or both of a VIM identifier and a session identifier to one another during selection of active/standby roles or as a part of one or more health status communications, e.g., to confirm that the VIMs 145/150 are storing the same current session identifier.

VIMs 145/150 use arbitrators 170 to monitor the health of/connections to each other and the witness node host device 130. For example, at block 230, the VIMs 145/150 monitor the availability of the witness node host device 130. If the witness node host device 130 is shut down, fails, or if one or both VIMs 145/150 lose connection with the witness node host device 130, method 200 returns to block 220 to select a new witness node.

If the witness node host device 130 remains available, at block 235, the standby VIM 145/150 determines if the active VIM 145/150 has shut down, failed, or is in poor health or if standby VIM 145/150 has lost connection to active VIM 145/150. If the active VIM 145/150 has failed or otherwise become unavailable to the standby VIM 145/150, method 200 continues via off page connector A to method 300 to determine if standby VIM 145/150 is to be promoted to active VIM 145/150. In one embodiment, standby VIM 145/150 waits a threshold period of time prior to continuing to off page connector A to allow for normal operation to resume and/or for active VIM 145/150 to respond to the loss of communication, as described with reference to FIGS. 3 and 4.

For example, if second VIM 150 is the current standby, second VIM 150 monitors the health of first VIM 145 and determines if a failover may have been triggered. As described above, second VIM 150 may determine that it has lost a connection to first VIM 145 or that first VIM 145 has failed in response to a lack of a heartbeat/health status message for a threshold period of time. Additionally, second VIM 150 may determine that first VIM 145 is not available in response to a health status message indicating that one or more critical services within first VIM 145 have failed or otherwise indicating that a failover should occur.

In one embodiment, first VIM 145 remedies the failure of a non-critical service within first VIM 145 by restarting that service. If, however, a threshold number of non-critical services within VIM 145 fail, or if one or more non-critical services fail a threshold number of times within a period of time, first VIM 145 initiates a failover to second VIM 150 or send a corresponding health status message to enable second VIM 150 to initiate the failover.

At block 240, in parallel to and in a manner similar to block 235, the active VIM 145/150 determines if the standby VIM 145/150 remains available or if active VIM 145/150 has lost connection to standby VIM 145/150. If the standby VIM 145/150 has failed or otherwise become unavailable to the active VIM 145/150, active VIM 145/150 stops replicating data and method 200 continues via off page connector B to method 400. In one embodiment, active VIM 145/150 waits a threshold period of time prior to continuing to off page connector B to allow for normal operation to resume.

If active and standby VIMs remain available, at block 245, active VIM 145/150 continues managing the host devices 130 and replicating data to the standby instance of the VIM 145/150 and blocks 230-240 repeat for the VIMs to monitor one another and the passive witness host device 130.

Figure 3:
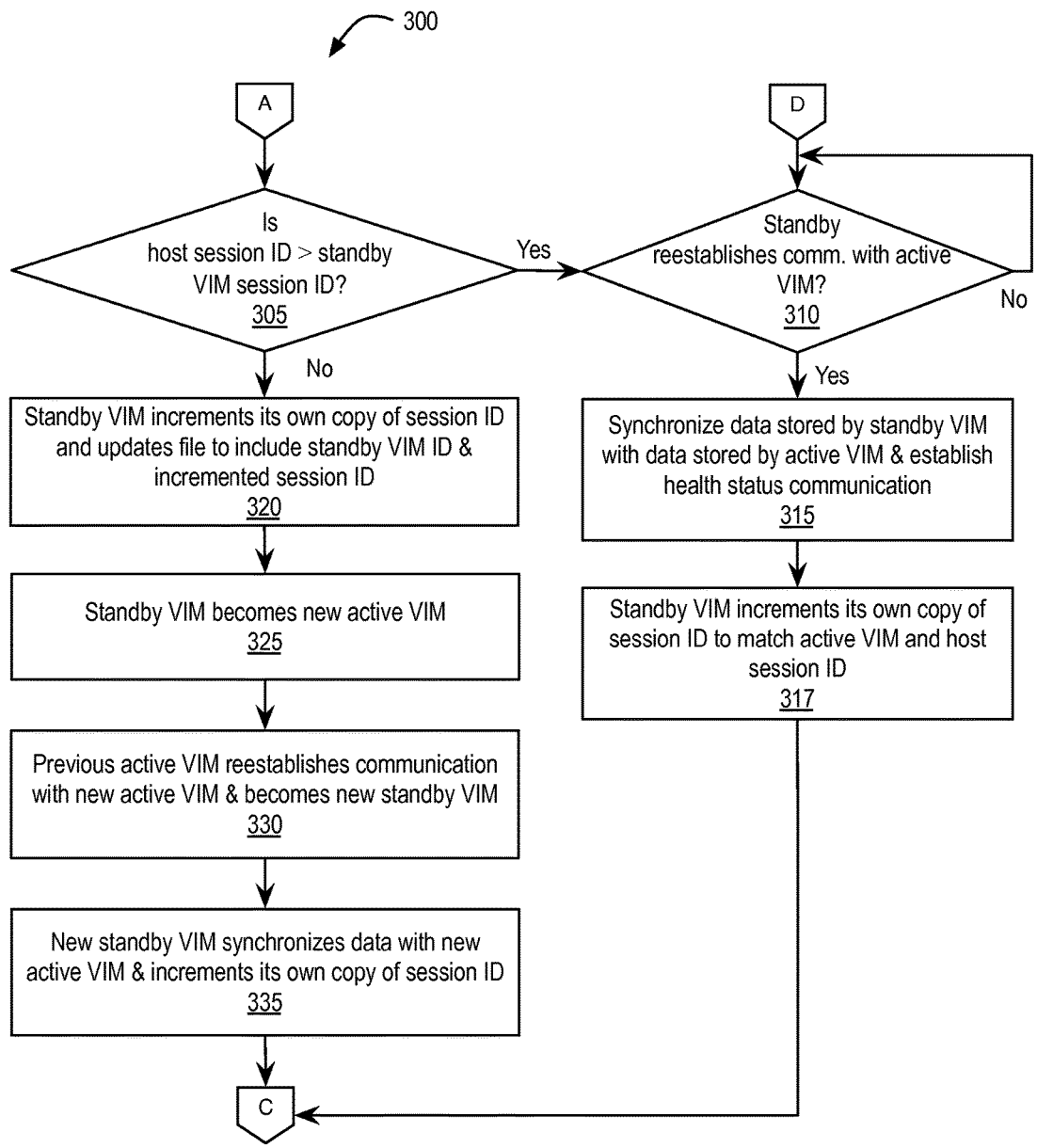
FIG. 3 is a flow chart illustrating an exemplary method of a standby virtual infrastructure manager responding to a failure of or lost connection to an active virtual infrastructure manager.

FIG. 3 is a flow chart illustrating exemplary method 300 of standby VIM 145/150 responding to a failure of or lost connection to active VIM 145/150. As described above, method 300 continues with off page connector A from block 235. At block 305, standby VIM 145/150 (e.g., using arbitrator 170) determines if the session identifier stored on the passive witness host device 130 is greater than the session identifier stored on standby VIM 145/150. For example, if the connection was lost between active and standby VIMs 145/150, and the active VIM 145/150 continues to function, standby VIM management data may be out of synch. To avoid an unnecessary failover, as discussed further below, the active VIM 145/150 increments the current session identifier (both the copy stored within active VIM 145/150 and the copy stored on passive witness host device 130). As described with reference to block 235, in one embodiment, standby VIM 145/150 waits a threshold period of time to allow active VIM 145/150 (if still operating) to increment the current session identifier prior to standby VIM 145/150 reading session identifier on the passive witness host device 130.

If the session identifier on the passive witness host device 130 is greater than the session identifier stored on standby VIM 145/150, at block 310, standby VIM 145/150 waits for a successful attempt to reestablish communication with active VIM 145/150. In one embodiment, in response to a threshold number of attempts to reestablish communication with active VIM 145/150, standby VIM 145/150 automatically restarts or generates a message requesting an administrator resolve the problem.

Once standby VIM 145/150 reestablishes communication with active VIM 145/150, at block 315, active VIM 145/150 replicates data to standby VIM 145/150 to synchronize the VIMs 145/150. For example, standby VIM 145/150 receives/pulls the archived WALs from active VIM 145/150 and recovers from them. The VIMs 145/150 also reestablish the exchange of health status messages.

At block 317, standby VIM 145/150 increments its copy of the session identifier to match the session identifier stored by the active VIM 145/150 and the passive witness host device 130. For example, standby VIM 145/150 may receive the current session identifier from active VIM 145/150 during the synchronization or in one or more health status messages. With active and standby VIMs 145/150 synchronized, communicating, and storing the same session identifier, method 300 returns to block 230 of method 200 via off page connector C.

Otherwise, if the session identifier on the passive witness host device 130 is not greater than the session identifier stored on standby VIM 145/150, at block 320, standby VIM 145/150 increments its local copy of the session identifier. Additionally, standby VIM 145/150 updates the file stored on passive witness host device 130 to replace the VIM identifier for the previous active VIM 145/150 with the VIM identifier for the standby VIM 145/150 to indicate it will be the new active VIM 145/150. For example, updating the file stored on passive witness host device 130 may include renaming the file. Standby VIM 145/150 also updates the file to increment the session identifier to the incremented session identifier stored on standby VIM 145/150.

At block 325, standby arbitrator 170 promotes standby VIM 145/150 to active VIM 145/150. For example, the various active VIM components described with reference to FIG. 1 are turned on or otherwise set to an active mode.

At block 330, when the previous active VIM 145/150 reestablishes communication (e.g., including health status messages) with the new active VIM 145/150. The previous active VIM 145/150 determines from a message received from the new active VIM 145/150 that the new active VIM 145/150 is storing a session identifier that is greater than the session identifier stored by the previous active VIM 145/150. In response, the previous active VIM 145/150 becomes the new standby VIM 145/150. For example, the various standby VIM components described with reference to FIG. 1 are turned off or otherwise set to standby mode.

At block 335, the new active VIM 145/150 replicates its data to the new standby VIM 145/150. Additionally, the new standby VIM 145/150 increments its copy of the session identifier. With active and standby VIMs 145/150 synchronized, communicating, and operating under the same session identifier, method 300 returns to block 230 of method 200 via off page connector C.

Figure 4:
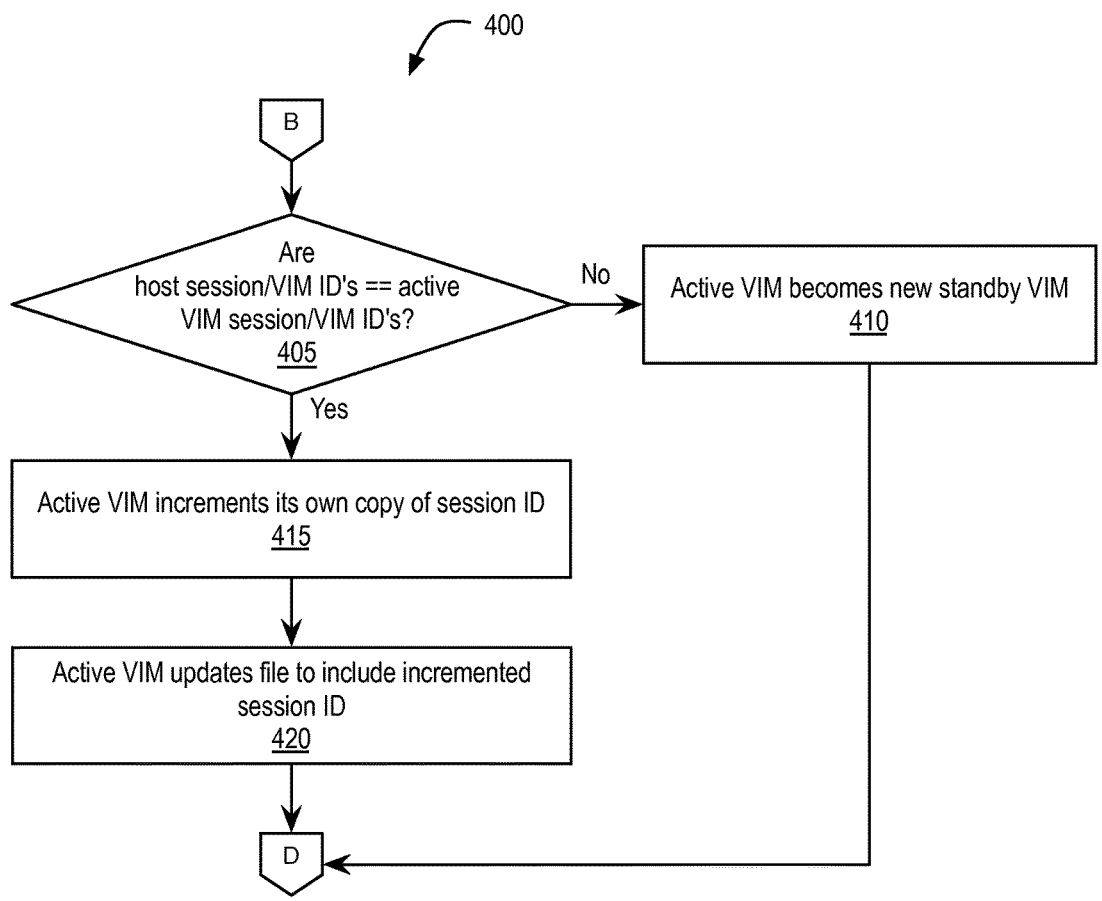
FIG. 4 is a flow chart illustrating an exemplary method of an active virtual infrastructure manager responding to a failure of or lost connection to a standby virtual infrastructure manager.

FIG. 4 is a flow chart illustrating exemplary method 400 of an active VIM 145/150 responding to a failure of or lost connection to a standby VIM 145/150. As described above, method 400 continues with off page connector B from block 240. At block 405, active VIM 145/150 determines if the VIM identifier and session identifier stored on the passive witness host device 130 match the identifier for the active VIM 145/150 and the current session identifier stored on the active VIM 145/150. If the VIM identifier and session identifier stored on the passive witness host device 130 are the VIM identifier for passive VIM 145/150 and a session identifier greater than the session identifier stored on active VIM 145/150, at block 410, active arbitrator 170 demotes active VIM 145/150 to standby. For example, the various standby VIM components described with reference to FIG. 1 are turned off or otherwise set to standby mode. With the previous active VIM 145/150 demoted to standby, method 400 continues via off page connector D to block 310 of method 300.

If the VIM identifier and session identifier stored on the passive witness host device 130 match the identifier for active VIM 145/150 and the current session identifier stored on active VIM 145/150, at block 415, active VIM 145/150 increments its own copy of the session identifier. At block 420, active VIM 145/150 increments or otherwise updates the session identifier stored on the passive witness host device 130 to match the incremented session identifier stored on the active VIM 145/150. While active VIM 145/150 continues to manage host devices 130, method 400 continues via off page connector D to block 310 of method 300.

Figure 5:
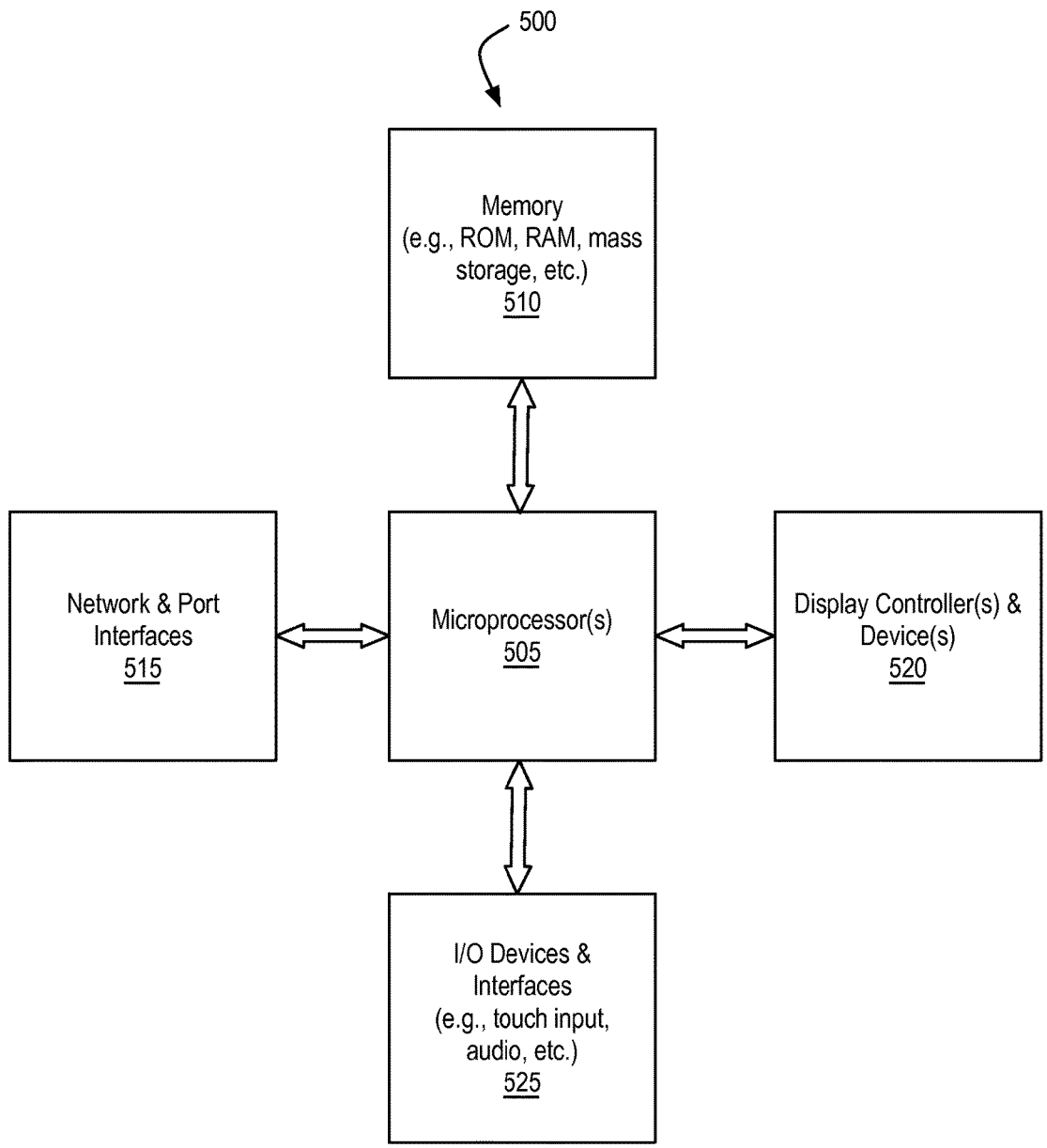
FIG. 5 illustrates, in block diagram form, an exemplary processing system to implement one or more components in a highly available virtualization management platform.

FIG. 5 illustrates, in block diagram form, exemplary processing system 500 to implement one or more components in a highly available virtualization management platform. Data processing system 500 includes one or more microprocessors 505 and connected system components (e.g., multiple connected chips). Alternatively, data processing system 500 is a system on a chip.

Data processing system 500 includes memory 510, which is coupled to microprocessor(s) 505. Memory 510 may be used for storing data, metadata, and programs for execution by the microprocessor(s) 505. Memory 510 may include one or more of volatile and non-volatile memories, such as Random Access Memory ("RAM"), Read Only Memory ("ROM"), a solid state disk ("SSD"), Flash, Phase Change Memory ("PCM"), or other types of data storage. Memory 510 may be internal or distributed memory.

Data processing system 500 includes network and port interfaces 515, such as a port, connector for a dock, or a connector for a USB interface, FireWire, Thunderbolt, Ethernet, Fibre Channel, etc. to connect the system 500 with another device, external component, or a network. Exemplary network and port interfaces 515 also include wireless transceivers, such as an IEEE 802.11 transceiver, an infrared transceiver, a Bluetooth transceiver, a wireless cellular telephony transceiver (e.g., 2G, 3G, 4G, etc.), or another wireless protocol to connect data processing system 500 with another device, external component, or a network and receive stored instructions, data, tokens, etc.

Data processing system 500 also includes display controller and display device 520 and one or more input or output ("I/O") devices and interfaces 525. Display controller and display device 520 provides a visual user interface for the user. I/O devices 525 allow a user to provide input to, receive output from, and otherwise transfer data to and from the system. I/O devices 525 may include a mouse, keypad or a keyboard, a touch panel or a multi-touch input panel, camera, optical scanner, audio input/output (e.g., microphone and/or a speaker), other known I/O devices or a combination of such I/O devices.

It will be appreciated that one or more buses, may be used to interconnect the various components shown in FIG. 5.

Data processing system 500 is an exemplary representation of (or hardware device running a virtualized version of) one or more of client devices 105, host devices 130, and VIMs 145/150 described above. Data processing system 500 may be a personal computer, tablet-style device, a personal digital assistant (PDA), a cellular telephone with PDA-like functionality, a Wi-Fi based telephone, a handheld computer which includes a cellular telephone, a media player, an entertainment system, or devices which combine aspects or functions of these devices, such as a media player combined with a PDA and a cellular telephone in one device. In other embodiments, data processing system 500 may be a network computer, server, or an embedded processing device within another device or consumer electronic product. As used herein, the terms computer, device, system, processing system, processing device, and "apparatus comprising a processing device" may be used interchangeably with data processing system 500 and include the above-listed exemplary embodiments.

It will be appreciated that additional components, not shown, may also be part of data processing system 500, and, in certain embodiments, fewer components than that shown in FIG. 5 may also be used in data processing system 500. It will be apparent from this description that aspects of the inventions may be embodied, at least in part, in software. That is, the computer-implemented method(s) 200, 300, and 400 may be carried out in a computer system or other data processing system 500 in response to its processor or processing system 505 executing sequences of instructions contained in a memory, such as memory 510 or other non-transitory machine-readable storage medium. The software may further be transmitted or received over a network (not shown) via network interface device 515. In various embodiments, hardwired circuitry may be used in combination with the software instructions to implement the present embodiments. Thus, the techniques are not limited to any specific combination of hardware circuitry and software, or to any particular source for the instructions executed by data processing system 500.

An article of manufacture may be used to store program code providing at least some of the functionality of the embodiments described above. Additionally, an article of manufacture may be used to store program code created using at least some of the functionality of the embodiments described above. An article of manufacture that stores program code may be embodied as, but is not limited to, one or more memories (e.g., one or more flash memories, random access memories—static, dynamic, or other), optical disks, CD-ROMs, DVD-ROMs, EPROMs, EEPROMs, magnetic or optical cards or other type of non-transitory machine-readable media suitable for storing electronic instructions. Additionally, embodiments of the invention may be implemented in, but not limited to, hardware or firmware utilizing an FPGA, ASIC, a processor, a computer, or a computer system including a network. Modules and components of hardware or software implementations can be divided or combined without significantly altering embodiments of the invention.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. References in the specification to "one embodiment," "an embodiment," "an exemplary embodiment," etc., indicate that the embodiment described may include a particular feature, structure, or characteristic, but not every embodiment may necessarily include the particular feature, structure, or characteristic. Moreover, such phrases are not necessarily referring to the same embodiment. Furthermore, when a particular feature, structure, or characteristic is described in connection with an embodiment, such feature, structure, or characteristic may be implemented in connection with other embodiments whether or not explicitly described. Blocks with dashed borders (e.g., large dashes, small dashes, dot-dash, dots) are used herein to illustrate optional operations that add additional features to embodiments of the invention. However, such notation should not be taken to mean that these are the only options or optional operations, and/or that blocks with solid borders are not optional in certain embodiments of the invention. Numerous specific details are described to provide a thorough understanding of various embodiments of the present invention. However, in certain instances, well-known or conventional details are not described in order to provide a concise discussion of embodiments of the present inventions.

It will be evident that various modifications may be made thereto without departing from the broader spirit and scope of the invention as set forth in the following claims. For example, the methods described herein may be performed with fewer or more features/blocks or the features/blocks may be performed in differing orders. Additionally, the methods described herein may be repeated or performed in parallel with one another or in parallel with different instances of the same or similar methods.

What is claimed is:

1. A computer-implemented method, comprising:
   determining, by a first virtual infrastructure manager (VIM), that the first VIM is to be an active manager of a plurality of virtual machines running on a plurality of host devices and that a second VIM is to be a standby manager of the plurality of virtual machines running on the plurality of host devices;
   selecting, by the first VIM, a first host device from the plurality of host devices to serve as a passive witness node in arbitrating active and standby roles between the first VIM and second VIM, wherein the passive witness node maintains a VIM identifier and session identifier for the active manager, wherein the first host device runs one or more virtual machines and is managed by the active manager, wherein the first host device is not the active manager, and wherein selecting the first host device includes determining that the first host device is available to both the first VIM and the second VIM comprising:
      the first VIM determining that the first host device is available to the first VIM,
      the first VIM providing an identification of the first host device to the second VIM, and
      the first VIM receiving confirmation from the second VIM that the first host device is available to the second VIM; and
   writing, by the first VIM, a first file on the first host device indicating that the first VIM is the active manager.

2. The computer-implemented method of claim 1, further comprising:
   determining that the first host device is no longer available to the first VIM or the second VIM;
   selecting a second host device from the plurality of host devices to serve as the passive witness node in response to determining the first host device is no longer available; and
   writing a second file on the second host device indicating that the first VIM is the active manager.

3. The computer-implemented method of claim 1, wherein the first file includes an identifier of the first VIM and a session identifier, the identifier indicating the active manager and the session identifier matching a copy of a current session value stored on each of the first VIM and the second VIM.

4. The computer-implemented method of claim 3, further comprising:
   determining, by the first VIM, that the first VIM is unable to communicate with the second VIM;
   determining, by the first VIM, that the first file on the first host device includes the identifier of the first VIM;
   incrementing, by the first VIM, the current session value stored on the first VIM; and updating, by the first VIM, the session identifier of the first file to the incremented current session value.

5. The computer-implemented method of claim 4, further comprising:
   reestablishing communication between the first VIM and the second VIM; and updating, by the second VIM, the copy of the current session value stored on the second VIM to the incremented current session value in response to reestablishing communication.

6. The computer-implemented method of claim 5, wherein reestablishing communication between the first VIM and the second VIM includes copying VM management data stored on the first VIM to the second VIM.

7. The computer-implemented method of claim 3, further comprising:
   determining, by the second VIM, that the second VIM is unable to communicate with the first VIM or that the first VIM is unable to continue as the active manager;
   determining, by the second VIM, that the first file on the first host device includes the identifier of the first VIM;
   determining, by the second VIM, that the second VIM is to be the active VIM;
   incrementing, by the second VIM, the copy of the current session value stored on the second VIM; and
   updating, by the second VIM, the session identifier of the first file to the incremented current session value and the identifier of the first VIM to the identifier of the second VIM.

8. The computer-implemented method of claim 7, further comprising:
   reestablishing communication between the first VIM and the second VIM; and
   updating, by the first VIM, the copy of the current session value stored on the first VIM to the incremented current session value in response to reestablishing communication.

9. The computer-implemented method of claim 8, wherein reestablishing communication between the first VIM and the second VIM includes copying VM management data stored on the second VIM to the first VIM.

10. A non-transitory computer-readable medium storing instructions, which when executed by a processing device, cause the processing device to perform a method comprising:
   determining, by a first virtual infrastructure manager (VIM), that the first VIM is to be an active manager of a plurality of virtual machines running on a plurality of host devices and that a second VIM is to be a standby manager of the plurality of virtual machines running on the plurality of host devices;
   selecting, by the first VIM, a first host device from the plurality of host devices to serve as a passive witness node in arbitrating active and standby roles between the first VIM and second VIM, wherein the passive witness node maintains a VIM identifier and session identifier for the active manager, wherein the first host device runs one or more virtual machines and is managed by the active manager, wherein the first host device is not the active manager, and wherein selecting the first host device includes determining that the first host device is available to both the first VIM and the second VIM comprising:
the first VIM determining that the first host device is available to the first VIM,
the first VIM providing an identification of the first host device to the second VIM, and
the first VIM receiving confirmation from the second VIM that the first host device is available to the second VIM; and
writing, by the first VIM, a first file on the first host device indicating that the first VIM is the active manager.

11. The non-transitory computer-readable medium of claim 10, the method further comprising:
determining that the first host device is no longer available to the first VIM or the second VIM;
selecting a second host device from the plurality of host devices to serve as the passive witness node in response to determining the first host device is no longer available; and
writing a second file on the second host device indicating that the first VIM is the active manager.

12. The non-transitory computer-readable medium of claim 10, wherein the first file includes an identifier of the first VIM and a session identifier, the identifier indicating the active manager and the session identifier matching a copy of a current session value stored on each of the first VIM and the second VIM.

13. The non-transitory computer-readable medium of claim 12, the method further comprising:
determining, by the first VIM, that the first VIM is unable to communicate with the second VIM;
determining, by the first VIM, that the first file on the first host device includes the identifier of the first VIM;
incrementing, by the first VIM, the current session value stored on the first VIM; and
updating, by the first VIM, the session identifier of the first file to the incremented current session value.

14. The non-transitory computer-readable medium of claim 13, the method further comprising:
reestablishing communication between the first VIM and the second VIM; and
updating, by the second VIM, the copy of the current session value stored on the second VIM to the incremented current session value in response to reestablishing communication.

15. The non-transitory computer-readable medium of claim 14, wherein reestablishing communication between the first VIM and the second VIM includes copying VM management data stored on the first VIM to the second VIM.

16. The non-transitory computer-readable medium of claim 12, the method further comprising:
determining, by the second VIM, that the second VIM is unable to communicate with the first VIM or that the first VIM is unable to continue as the active manager;
determining, by the second VIM, that the first file on the first host device includes the identifier of the first VIM;
determining, by the second VIM, that the second VIM is to be the active VIM;
incrementing, by the second VIM, the copy of the current session value stored on the second VIM; and
updating, by the second VIM, the session identifier of the first file to the incremented current session value and the identifier of the first VIM to the identifier of the second VIM.

17. The non-transitory computer-readable medium of claim 16, the method further comprising:
reestablishing communication between the first VIM and the second VIM; and
updating, by the first VIM, the copy of the current session value stored on the first VIM to the incremented current session value in response to reestablishing communication.

18. The non-transitory computer-readable medium of claim 17, wherein reestablishing communication between the first VIM and the second VIM includes copying VM management data stored on the second VIM to the first VIM.

19. An apparatus comprising:
a processor coupled to a memory, wherein the processor executes instructions that cause the apparatus to perform a method comprising:
determining, by a first virtual infrastructure manager (VIM), that the first VIM is to be an active manager of a plurality of virtual machines running on a plurality of host devices and that a second VIM is to be a standby manager of the plurality of virtual machines running on the plurality of host devices;
selecting, by the first VIM, a first host device from the plurality of host devices to serve as a passive witness node in arbitrating active and standby roles between the first VIM and second VIM, wherein the passive witness node maintains a VIM identifier and session identifier for the active manager, wherein the first host device runs one or more virtual machines and is managed by the active manager, wherein the first host device is not the active manager, and wherein selecting the first host device includes determining that the first host device is available to both the first VIM and the second VIM comprising:
the first VIM determining that the first host device is available to the first VIM,
the first VIM providing an identification of the first host device to the second VIM, and
the first VIM receiving confirmation from the second VIM that the first host device is available to the second VIM; and
writing, by the first VIM, a first file on the first host device indicating that the first VIM is the active manager.

20. The apparatus of claim 19, the method further comprising:
determining that the first host device is no longer available to the first VIM or the second VIM;
selecting a second host device from the plurality of host devices to serve as the passive witness node in response to determining the first host device is no longer available; and
writing a second file on the second host device indicating that the first VIM is the active manager.

* * * * *